US005187592A

United States Patent [19]
Sugiyama et al.

[11] Patent Number: 5,187,592
[45] Date of Patent: Feb. 16, 1993

[54] IMAGE COMMUNICATION METHOD AND APPARATUS WITH SELECTION OF BINARIZATION METHOD FOR TRANSMISSION

[75] Inventors: Mitsumasa Sugiyama; Shigetada Kobayashi, both of Yokohama, Japan

[73] Assignee: Canon Kabushiki Kaisha, Tokyo, Japan

[21] Appl. No.: 669,587

[22] Filed: Mar. 14, 1991

[30] Foreign Application Priority Data

Mar. 15, 1990 [JP] Japan .................................. 2-065434
Mar. 15, 1990 [JP] Japan .................................. 2-065435
Mar. 15, 1990 [JP] Japan .................................. 2-065436
Mar. 15, 1990 [JP] Japan .................................. 2-065437
Jun. 19, 1990 [JP] Japan .................................. 2-161906

[51] Int. Cl.$^5$ .............................................. H04N 1/40
[52] U.S. Cl. .................................... 358/430; 358/426
[58] Field of Search ... 358/429, 430, 426, 261.1-261.3, 358/262.1, 427

[56] References Cited

U.S. PATENT DOCUMENTS

| 4,542,411 | 9/1985 | Imanaka et al. | 358/430 |
| 4,622,585 | 11/1986 | Reitsma | 358/430 |
| 4,831,636 | 5/1989 | Taniguchi et al. | 358/430 |
| 4,920,426 | 4/1990 | Hatori et al. | 358/430 |
| 4,926,268 | 5/1990 | Kawamura et al. | 358/458 |

FOREIGN PATENT DOCUMENTS

| 060694 | 9/1982 | European Pat. Off. |
| 286286 | 10/1988 | European Pat. Off. |
| 3229858 | 3/1983 | Fed. Rep. of Germany |
| 1401637 | 7/1975 | United Kingdom |
| 2105554 | 3/1983 | United Kingdom |

Primary Examiner—Stephen Brinich
Attorney, Agent, or Firm—Fitzpatrick, Cella, Harper & Scinto

[57] ABSTRACT

According to this invention, when n-value image data is transmitted, data associated with its compression method is transmitted to a reception-side apparatus, so that the reception-side apparatus can perform proper image processing. More specifically, there is disclosed an image transmission method having the following advantages. That is, when a reception-side apparatus can select one of a plurality of image processing methods, it selects a processing method matching with an n-value compression method, and properly reproduces an m-value image. Even when the reception-side apparatus does not have an image processing method matching the n-value compression method of a transmission-side apparatus, that fact can be communicated to the transmission-side apparatus or to an operator of the reception-side apparatus, so that operators of the transmission- and reception-side apparatuses can recognize that a color difference will occur between the transmission- and reception-side apparatuses, and an effective countermeasure can be taken.

44 Claims, 14 Drawing Sheets

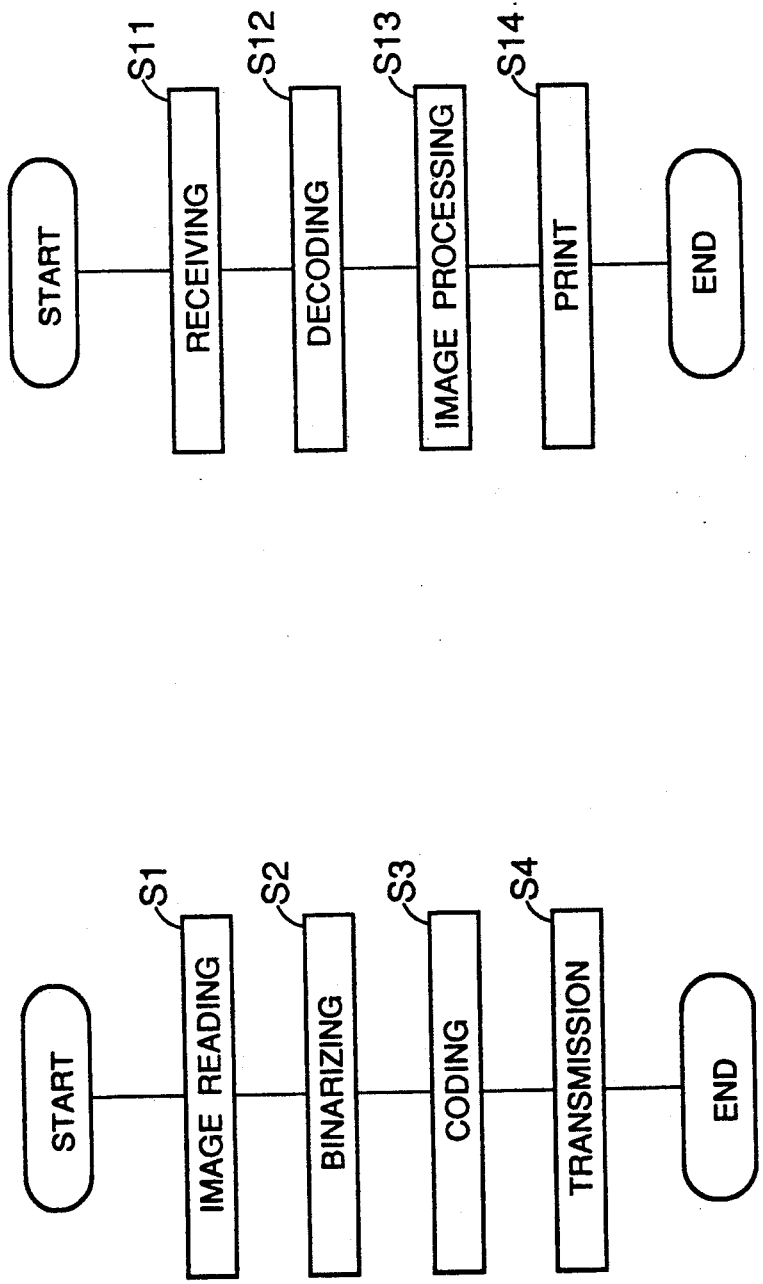

FIG.6

| 248 | 120 | 216 | 88 |
|---|---|---|---|
| 56 | 184 | 24 | 152 |
| 200 | 72 | 232 | 104 |
| 8 | 136 | 40 | 168 |

FIG.7

| 40 | 104 | 168 | 24 |
|---|---|---|---|
| 184 | 248 | 232 | 88 |
| 120 | 200 | 216 | 152 |
| 56 | 136 | 72 | 8 |

FIG.8

| 0 | 1 | 0 | 1 | 0 | 1 | 0 | 1 |
|---|---|---|---|---|---|---|---|
| 1 | 0 | 1 | 1 | 1 | 0 | 1 | 1 |
| 0 | 1 | 0 | 1 | 0 | 1 | 0 | 1 |
| 1 | 1 | 1 | 0 | 1 | 1 | 1 | 0 |

FIG.9

| 1 | 1 | 0 | 1 | 1 | 1 | 0 | 1 |
|---|---|---|---|---|---|---|---|
| 0 | 0 | 0 | 1 | 0 | 0 | 0 | 1 |
| 1 | 0 | 0 | 1 | 1 | 0 | 0 | 1 |
| 1 | 1 | 1 | 1 | 1 | 1 | 1 | 1 |

FIG.10

| CODES | BINARIZING |
|---|---|
| 0001 | BAYER TYPE DITHERING |
| 0010 | FATNING TYPE DITHERING |
| 0100 | ERROR DIFFUSION |
| 1000 | SIMPLE BINARIZING |
| 0000 | NON-BINARIZING |

FIG.11

| 1 1 1 1 |
|---|

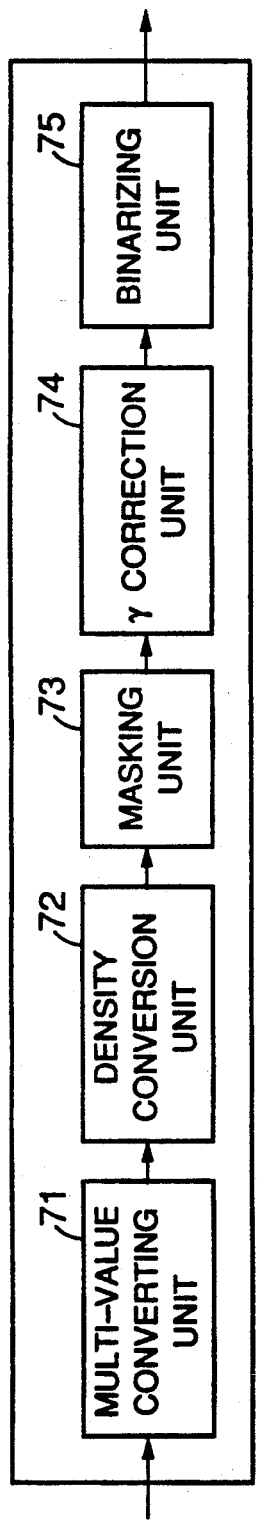

FIG.21

| 1 | ERROR DIFFUSION METHOD | ROM1 |
|---|---|---|
| 2 | BAYER TYPE DITHERING | ROM2 |
| 3 | FATNING TYPE DITHERING | ROM3 |
| 4 | SIMPLE THRESHOLD METHOD | ROM4 |

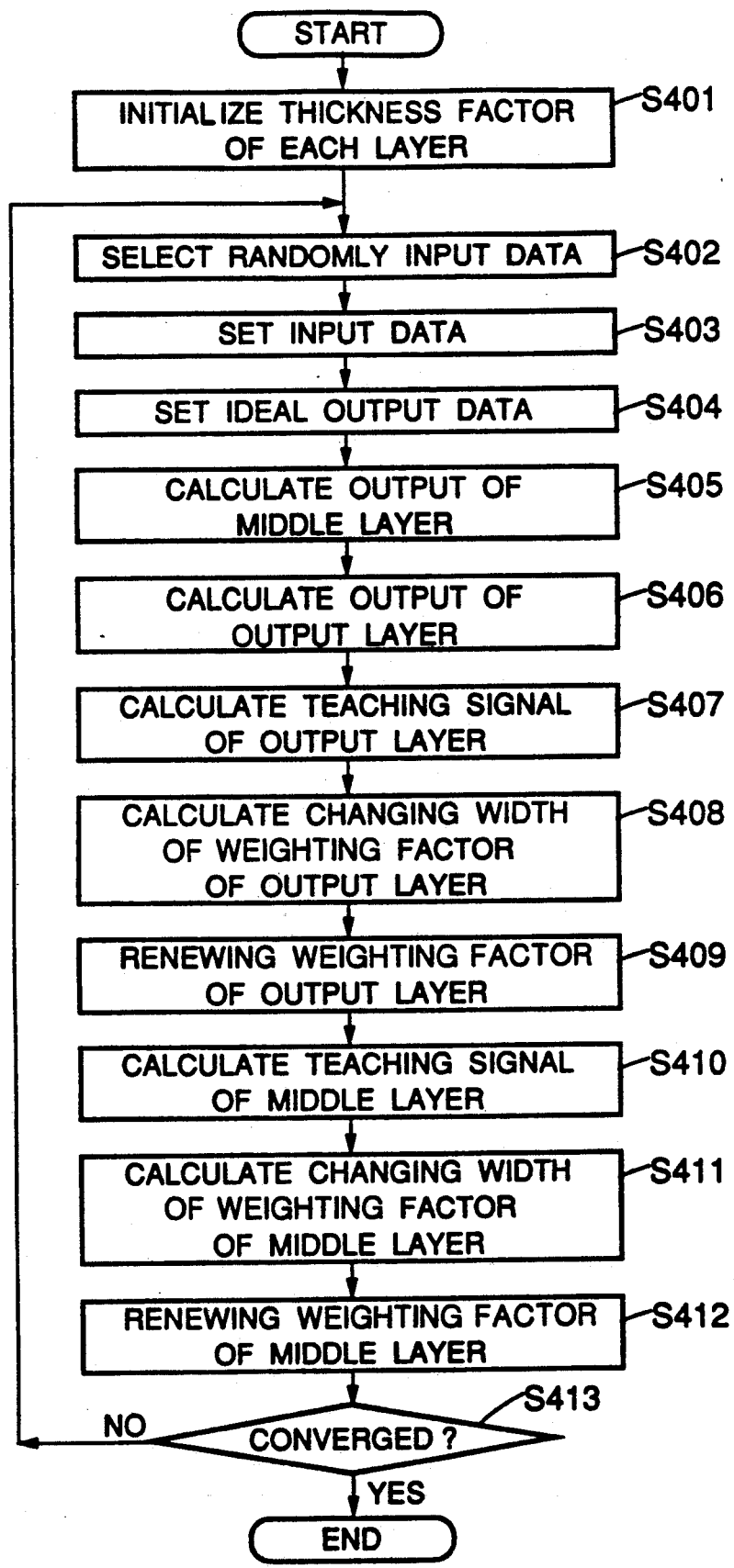

＊:PIXEL TO BE CONVERTED

IMAGE COMMUNICATION METHOD AND APPARATUS WITH SELECTION OF BINARIZATION METHOD FOR TRANSMISSION

BACKGROUND OF THE INVENTION

1. Field of the Invention

The present invention relates to an image communication method and apparatus for transmitting image information, and the like.

2. Related Background Art

Conventionally, various color facsimile apparatuses for communicating color images have been proposed. In a color image, since color data of each of the color components, red (R), green (G), and blue (B), has 256 gradation levels between 0 to 255, the data volume is very large, and the communication time is prolonged, as compared to those of a black-and-white image. For this reason, it is very difficult to put such an apparatus for directly transmitting multi-value data into practical application.

As a method of compressing the data volume of a color image, each of R, G, and B data is binarized from 256 gradation levels between 0 to 255 to 2 gradation levels of 0 and 1, and binary data is coded by a conventional coding method in a facsimile apparatus such as MMR, MR, or the like.

However, when a received color binary image is color-processed, and is printed out, colors vary depending on the type used in binarizing method of binarizing the original multi-value image, and an image in colors different from those of the color image which was to be transmitted is undesirably printed out the receiver side.

Colors of an image to be transmitted are different from those of an image printed out by a receiver like in a case wherein image data which is binarized by a Fatning type dithering method is transmitted to a receiver which is adjusted to reproduce appropriate colors of an image which is binarized by a Bayer type dithering method.

There is also proposed a method of presuming multi-value data from a binary pattern of a rectangular region in a binary image by utilizing a neural network.

The method utilizing a neural network can realize good multi-value restoration by learning.

However, multi-value restoration by a neural network depends on the binarizing method of the binary data used in learning. Therefore, since various binarizing methods exist, even when a neural network which learns an image binarized by an error diffusion method is used in restoration of an image binarized by a dithering method, good multi-value data cannot always be obtained.

SUMMARY OF THE INVENTION

It is, therefore, an object of the present invention to provide an image communication method or apparatus capable of solving the above-mentioned problems individually or entirely.

It is another object of the present invention to provide an image reception method or apparatus capable of dealing with various compression methods.

It is still another object of the present invention to provide an image transmission method or apparatus which allows a reception side to appropriately deal with transmission data.

According to a preferred embodiment of the present invention, when n-value image data is transmitted, data associated with its compression method is transmitted to a reception-side apparatus, so that the reception-side apparatus can perform proper image processing. More specifically, there is disclosed an image transmission method having the following advantages. That is, when a reception-side apparatus can select one of a plurality of image processing methods, it selects a processing method matching with an n-value compression method, and properly reproduces an m-value image. Even when the reception-side apparatus does not have an image processing method matching with the n-value compression method of a transmission-side apparatus, that fact can be communicated to the transmission-side apparatus or to an operator of the reception side apparatus, so that operators of the transmission- and reception-side apparatuses can recognize that a color difference will occur between the transmission- and reception-side apparatuses, and an effective countermeasure can be taken.

It is still another object of the present invention to provide an image communication method which can satisfactorily perform a printing operation even when a color image which is compressed to n-value data, is transmitted and is printed out.

It is still another object of the present invention to provide an image communication method which allows a reception side to satisfactorily perform image processing without sending data associated with an n-value method from a transmission side.

It is still another object of the present invention to provide an image communication method and apparatus which can satisfactorily transmit a color image signal using an ISDN.

It is still another object of the present invention to provide an image communication method which can process image data which is compressed to n-value data using a neural network.

The above and other objects and features of the present invention will be apparent from the following embodiments, and the accompanying drawings.

BRIEF DESCRIPTION OF THE DRAWINGS

FIG. 4 is a schematic flow chart showing a transmission operation of the embodiment shown in FIG. 1;

FIG. 5 is a schematic flow chart showing a reception operation of the embodiment shown in FIG. 1;

FIG. 6 shows a threshold value matrix of a Bayer type dithering method;

FIG. 7 shows a threshold value matrix of a Fatning type dithering method;

FIG. 8 shows image data binarized by the Bayer type dithering method;

FIG. 9 shows image data binarized by the Fatning type dithering method;

FIG. 10 is a table showing code data corresponding to four binarizing methods of the embodiment shown in FIG. 1;

FIG. 11 shows code data for informing binarizing methods of an image communication apparatus of the embodiment shown in FIG. 1 to a destination apparatus;

FIG. 14 is a block diagram showing another arrangement of an image processing unit according to another embodiment of the present invention;

FIG. 15 shows an arrangement of a smoothing filter for the Bayer type dithering method in the embodiment shown in FIG. 14;

FIG. 16 shows an arrangement of a smoothing filter for the Fatning type dithering method in the embodiment shown in FIG. 14;

FIG. 21 is a table showing the relationship between conversion tables and binarizing methods;

FIG. 22B is a flow chart showing a learning sequence of the neural network; and

DETAILED DESCRIPTION OF THE PREFERRED EMBODIMENTS

Figure 1:
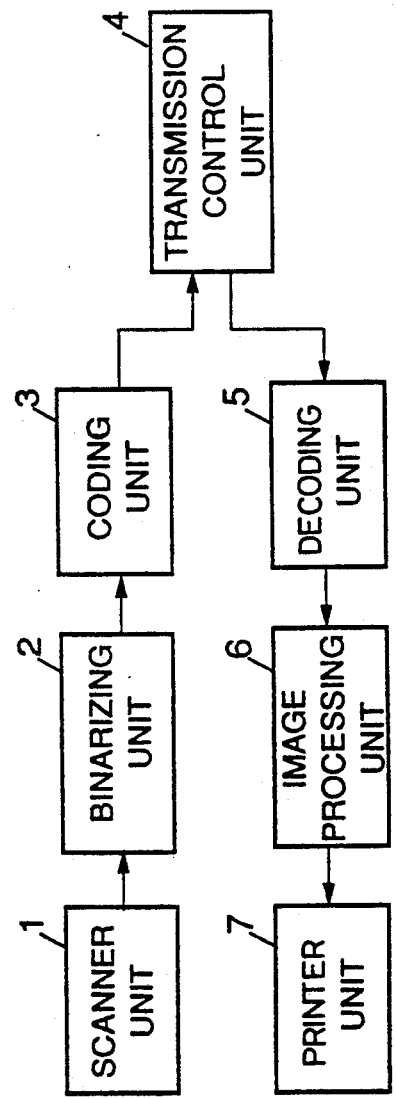
FIG. 1 is a block diagram showing an arrangement according to an embodiment of the present invention.

FIG. 1 is a block diagram showing an arrangement according to an embodiment of the present invention.

An image communication apparatus of this embodiment comprises a scanner unit 1 for reading a color image on an original, a binarizing unit 2 for binarizing color image data input from the scanner unit 1, a coding unit 3 for coding the binary data by MMR, MR, or the like to compress the data volume, a transmission control unit 4 for performing a communication with another image communication apparatus through a telephone line or an ISDN network to exchange coded data, a decoding unit 5 for decoding received coded data, an image processing unit 6 for processing image data in correspondence with characteristics of a printer unit 7, and the printer unit 7 for printing out image data. Note that the binarizing unit 2 outputs input multi-value image data as multi-value image data without binarizing it.

Figure 2:
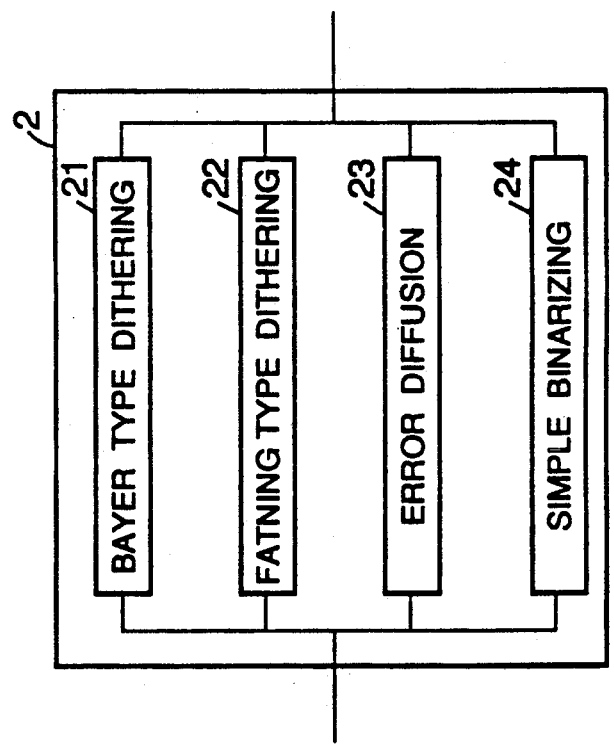
FIG. 2 is a block diagram showing an arrangement of a binarizing unit of the embodiment shown in FIG. 1.

FIG. 2 is a block diagram showing an arrangement of the binarizing unit 2.

The binarizing unit 2 of this embodiment comprises four binarizing means 21 to 24 for respectively binarizing data by a Bayer type dithering method, a Fatning type dithering method, an error diffusion method, and a simple binarizing method. The unit 2 selects one of these four binarizing units 21 to 24 to binarize image data, and can also supply image data to the coding unit 3 without binarizing it.

Figure 3:
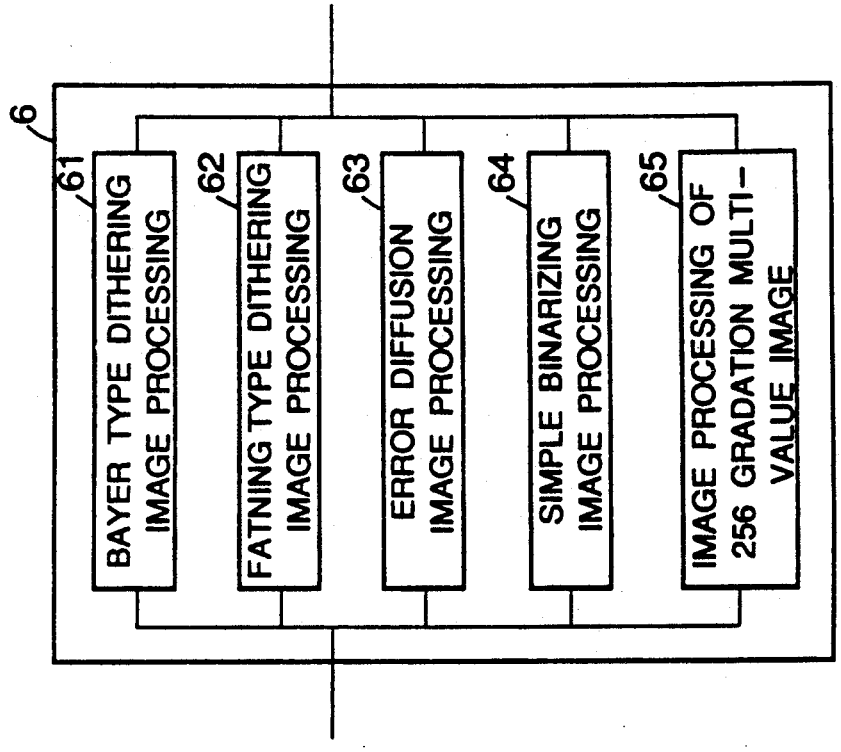
FIG. 3 is a block diagram showing an arrangement of an image processing unit of the embodiment shown in FIG. 1.

FIG. 3 is a block diagram showing an arrangement of the image processing unit 6.

The image processing unit 6 of this embodiment comprises four image processing means 61 to 64 corresponding to the four binarizing methods, i.e., the Bayer type dithering method, the Fatning type dithering method, the error diffusion method, and the simple binarizing method, and also comprises an image processing means 65 for a non-binarized 256-gradation image.

The image processing unit 6 selects one of these image processing means 61 to 64 to perform image processing of coded image data, and supplies the processed data to the printer unit 7.

FIG. 4 is a schematic flow chart showing a transmission operation, and FIG. 5 is a schematic flow chart showing a reception operation.

In a transmission mode, the scanner unit 1 reads a color image, and supplies R, G, and B 256-gradation data (0 to 255) corresponding to dots at, e.g., 400 dpi to the binarizing unit 2 (S1). The binarizing unit 2 binarizes the R, G, and B 256-gradation data of the color image data, and sends them to the coding unit 3 (S2). In this manner, the scanner unit 1 requires 8 bits for each of R, G, and B data in units of dots, i.e., a total of 24 bits. However, when these data are binarized, each of R, G, and B data requires one bit, i.e., these data require a total of only 3 bits. Thus, these data are compressed to $\frac{1}{8}$.

The coding unit 3 encodes input data by a coding method such as MMR, MR, or the like, and sends the coded image data to the transmission control unit 4 (S3). The transmission control unit 4 exchanges procedure signals with a receiver, and then transmits data associated with a binarizing method and image data to the receiver (S4).

In FIG. 5, when the transmission control unit 4 receives the data associated with the binarizing method and the image data (S11), the received image data is sent to and decoded by the decoding unit 5, and the decoded data is supplied to the image processing unit 6 (S12). The image processing unit 6 performs image processing in accordance with the data associated with the binarizing method received from the transmission control unit 4 (S13), and supplies the processed data to the printer unit 7 to print it out (S14).

Conventionally, many methods have been proposed as multi-value image binarizing methods. However, these methods have both merits and demerits, and no optimal binarizing method in all cases and in all respects is proposed.

As typical binarizing methods, (1) the Bayer type dithering method, (2) the Fatning type dithering method, (3) the error diffusion method, and (4) the simple binarizing method are available. In the Bayer and Fatning type dithering methods, an image and a threshold value matrix are compared with each other, and if image data is larger than a corresponding threshold value, "1" is set; otherwise, "0" is set.

FIG. 6 shows a threshold value matrix of the Bayer type dithering method, and FIG. 7 shows a threshold value matrix of the Fatning type dithering method.

One feature of the Bayer type dithering method is that dots tend to be scattered upon binarizing of this method. Contrary to this, it is a feature of the Fatning type dithering method is that dots tend to be concentrated.

FIGS. 8 and 9 show image data obtained by binarizing a flat image having a luminance of 160 by the above-mentioned methods. Portions having "0" data, i.e., dark portions are scattered when an image is binarized by the Bayer type dithering method, while they are concentrated by the Fatning type dithering method.

When these two binarized images are printed by, e.g., an ink-jet printer, considerably different images are obtained due to the influence of a blurred ink. More specifically, in an image binarized by the Bayer type dithering method, since dark portions, i.e., dots formed by an ink are scattered, an ink is considerably blurred. Contrary to this, in an image binarized by the Fatning dithering method, since dots are concentrated, an ink is not so blurred. As a result, the image binarized by the Bayer type dithering method becomes a darker image than that by the Fatning type dithering method.

In this manner, if images binarized by the different binarizing methods are subjected to the same image processing, different colors are undesirably obtained. In order to obtain an optimal color image, image processing matching with a binarizing method used must be performed.

In this embodiment, as the binarizing methods, the Bayer type dithering method, the Fatning type dithering method, the error diffusion method, and the simple binarizing method are available. In general, when a resolution is low, the Bayer type dithering method can provide a good image; otherwise, the Fatning type dithering method can provide a good image. The dithering methods are suitable for halftone images such as photographs, but are not suitable for images having clear contrast such as character images. Furthermore, the error diffusion method suffers from a large data volume after coding although a good image can be obtained. The simple binarizing method is not suitable for halftone images.

Therefore, in this embodiment, a binarizing method is selected by an operator, or by automatic discrimination based on a resolution or a text or photograph mode, or by communicating with a receiver in step S2 in FIG. 4. More specifically, in this embodiment, the binarizing method can be selected manually or automatically in step S2.

In this embodiment, binarizing methods of transmission data in a transmitter, and binarizing methods which are available upon image processing of received data in a receiver are expressed by predetermined codes, and these codes are exchanged between the two apparatuses as the above-mentioned data associated with the binarizing method. Thus, the binarizing means 21 to 24 and the image processing means 61 to 65 are selected with reference to the code data.

FIG. 10 shows code data corresponding to the four binarizing methods described above.

In this embodiment, a four-bit code corresponds to each binarizing method. As described above, a code is also assigned to a case wherein data is not binarized. When the code data is sent to a receiver upon transmission of image data, the binarizing method of the image data can be identified.

FIG. 11 shows code data for informing the binarizing methods of an image communication apparatus to a destination apparatus.

The code data is obtained by logically ORing the codes shown in FIG. 10. When this code data is sent to a destination apparatus, the binarizing methods of this image communication apparatus can be informed to the destination apparatus.

In this embodiment, code data representing binarizing methods of the image processing unit 6 when the image data is received is common to the code data shown in FIG. 11.

Note that the code data shown in FIG. 11 is registered in advance in a predetermined memory area of the transmission control unit 4.

Figure 12:
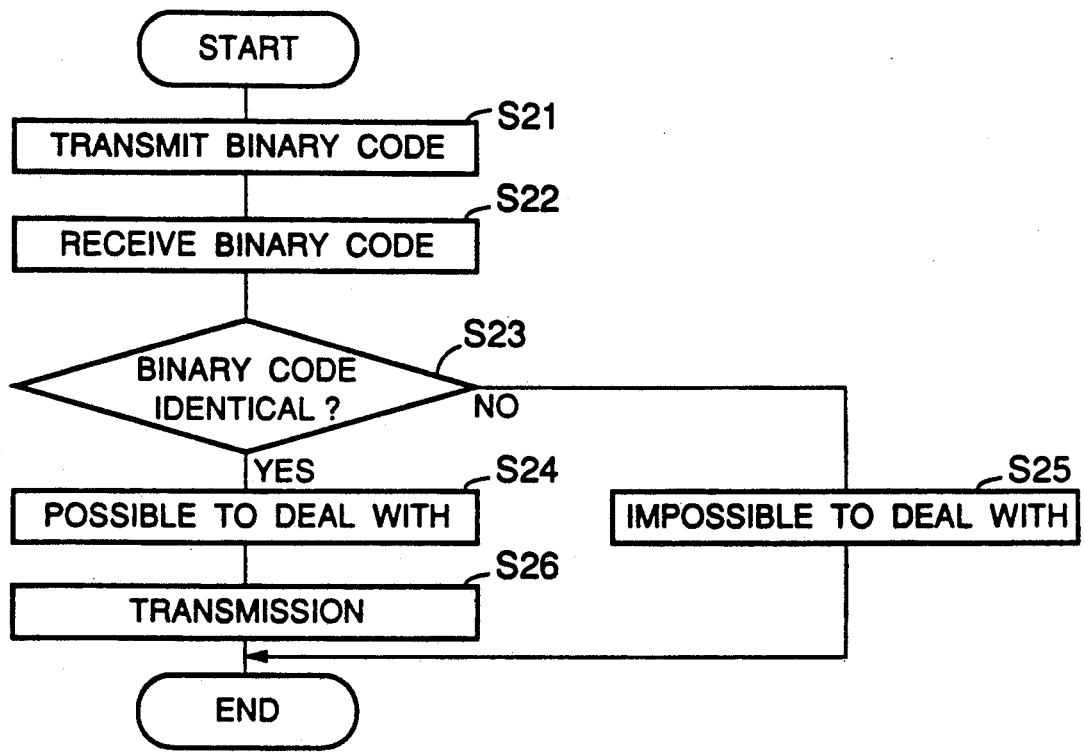
FIG. 12 is a flow chart showing an operation of a transmitter so as to discriminate whether or not a receiver can deal with the binarizing methods in the embodiment shown in FIG. 1.
Figure 13:
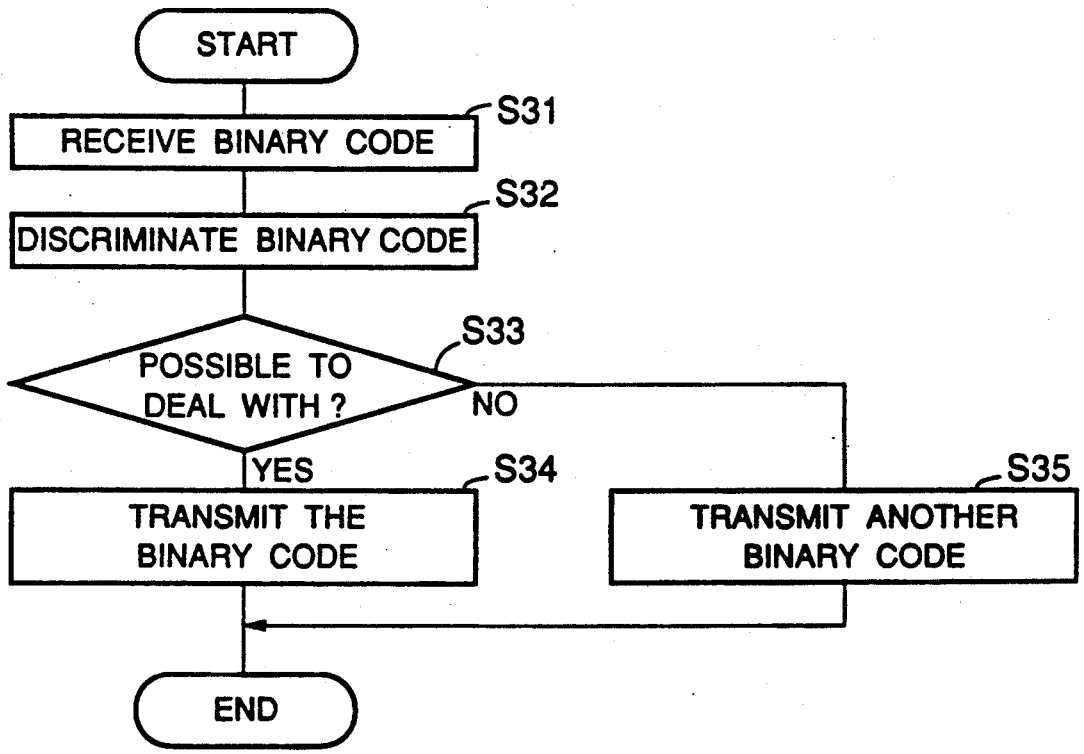
FIG. 13 is a flow chart showing an operation of a receiver so as to discriminate whether or not a transmitter can deal with the binarizing methods in the embodiment shown in FIG. 1.

FIGS. 12 and 13 are flow charts showing operations for discriminating, using the code representing the binarizing methods, whether or not a receiver can deal with a binarizing method of a transmitter. FIG. 12 shows an operation of the transmitter, and FIG. 13 shows an operation of the receiver.

The transmission control unit 4 informs the code representing the binarizing methods to the receiver by means of a predetermined procedure signal (S21).

More specifically, when the receiver is an image communication apparatus complying with the G3 facsimile standards, the code representing the binarizing method can be transmitted to the receiver using an initial identification signal of a non-standard function, e.g., four specific bits of an NSF signal.

When the receiver is an image communication apparatus complying with the G4 facsimile standards, the code representing the binarizing method can be transmitted to the receiver using, e.g., specific four bits of a user-to-user signal based on the TTC recommendation, ISDN network interface part 3, layer 3 specification 4.5.24.

On the other hand, the receiver receives the four specific bits of the above-mentioned NSF signal or the user-to-user signal (S31), and decodes it to identify the binarizing method (S32).

When the receiver can deal with the binarizing method (S33), it transmits the binary code using the NSF signal or the user-to-user signal (S34); otherwise, it transmits a binary code other than the received binary code using the NSF signal or the user-to-user signal (S35), thereby informing the transmitter whether or not the receiver can deal with the identified method.

The transmitter receives the NSF signal or the user-to-user signal from the receiver (S22), and discriminates its specific four bits (S23), thereby discriminating whether or not the receiver can deal with the binarizing method represented by the transmitted binary code (S24, S25).

Thereafter, if the transmitter discriminates that the receiver can deal with the identified method, it transmits image data binarized by the binarizing means corresponding to the identified binarizing method (S26).

When the receiver cannot deal with the informed method, in step S35, it can transmit the code (in this embodiment, 1111 shown in FIG. 11) which is registered in the transmission control unit 4 and represents binarizing methods which are available in the receiver using the NSF signal or the user-to-user signal.

In this case, the transmitter discriminates the specific 4 bits of the NSF signal or the user-to-user signal, thereby discriminating binarizing methods available in the receiver. Therefore, the transmitter compares the binarizing methods available in the receiver, and those available in the transmitter, and selects an optimal one. Thus, the transmitter can binarize data by a binarizing method available in the receiver, and can transmit the binarizing method and image data to the receiver by the above-mentioned transmission operation.

When the transmission control unit 4 of the receiver discriminates the binarizing method informed from the transmitter, it supplies the discriminated binarizing method to the decoding unit 5 and the image processing unit 6. The image processing unit 6 selects the corresponding image processing means on the basis of the input binarizing method to perform image processing of the received image data, and supplies the processed data to the printer unit 7 to print it out.

Note that the above-mentioned code data may be exchanged in advance with a specific image communication apparatus, and binarizing methods of the specific image communication apparatus, and corresponding binarizing methods may be registered in, e.g., a memory area of the transmission control unit 4. Thus, the binarizing means 21 to 24 and the image processing means 61 to 65 may be selected based on the registered code data. Code data of an image communication apparatus, which data cannot be registered in advance, can be exchanged in a communication protocol when image data is transmitted/received, as described above.

FIG. 14 is a block diagram showing another arrangement of the image processing unit.

More specifically, the image processing unit comprises a multi-value converting unit 71, a density conversion unit 72, a color masking unit 73, a γ correction unit 74, and a binarizing unit 75.

The multi-value converting unit 71 performs multi-value conversion by smoothing processing. Another arrangement of the multi-value converting unit 71 will be described later. FIGS. 15 and 16 show arrangements of smoothing filters for image data which are binarized by the Bayer type dithering method and the Fatning type dithering method, respectively.

In this manner, when a multi-value conversion method is switched in accordance with the type of transmitted binary signal, a high-quality image signal can be obtained. For data binarized by the error diffusion method, a window for filtering binary data may be continuously moved, while for data binarized by a dithering method, the window may be intermittently moved without being moved continuously.

The density conversion unit 72 searches a look-up table to convert image data from luminance (RGB) data to density (cmy) data. Different look-up tables may be prepared in accordance with binarizing methods, or the same table may be used for the different methods.

The color masking unit 73 performs masking processing for correcting muddiness of inks in the printer unit 7.

The γ correction unit 74 performs γ correction in correspondence with characteristics of the printer unit 7, and the binarizing unit 75 performs binarization for a printer output.

Different sets of the masking unit 73, the γ correction unit 74, and the binarizing unit 75 may be prepared in accordance with binarizing methods, or they may be common to different binarizing methods. Alternatively, a common circuit may be employed, and only parameters may be changed in such a manner that a color masking parameter varies depending on binarizing methods.

The image processing unit discriminates the binarizing method of a received image, and selects the image processing means 61 to 65 or the multi-value converting unit 71, the density conversion unit 72, the color masking unit 73, the γ correction unit 74, and the binarizing unit 75, thus performing optimal image processing.

Figure 17:
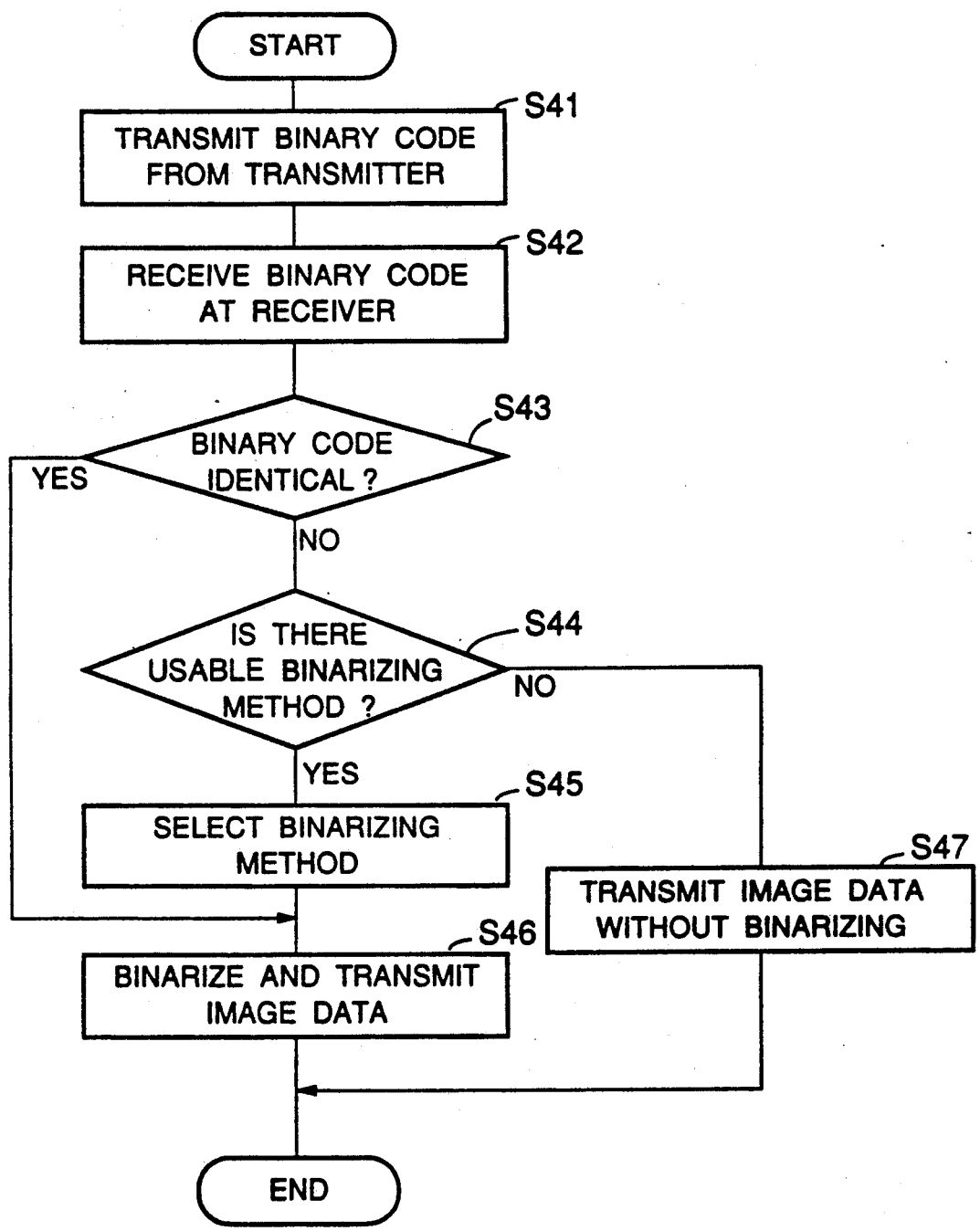
FIG. 17 is a flow chart showing an operation of a transmitter according to still another embodiment of the present invention.
Figure 18:
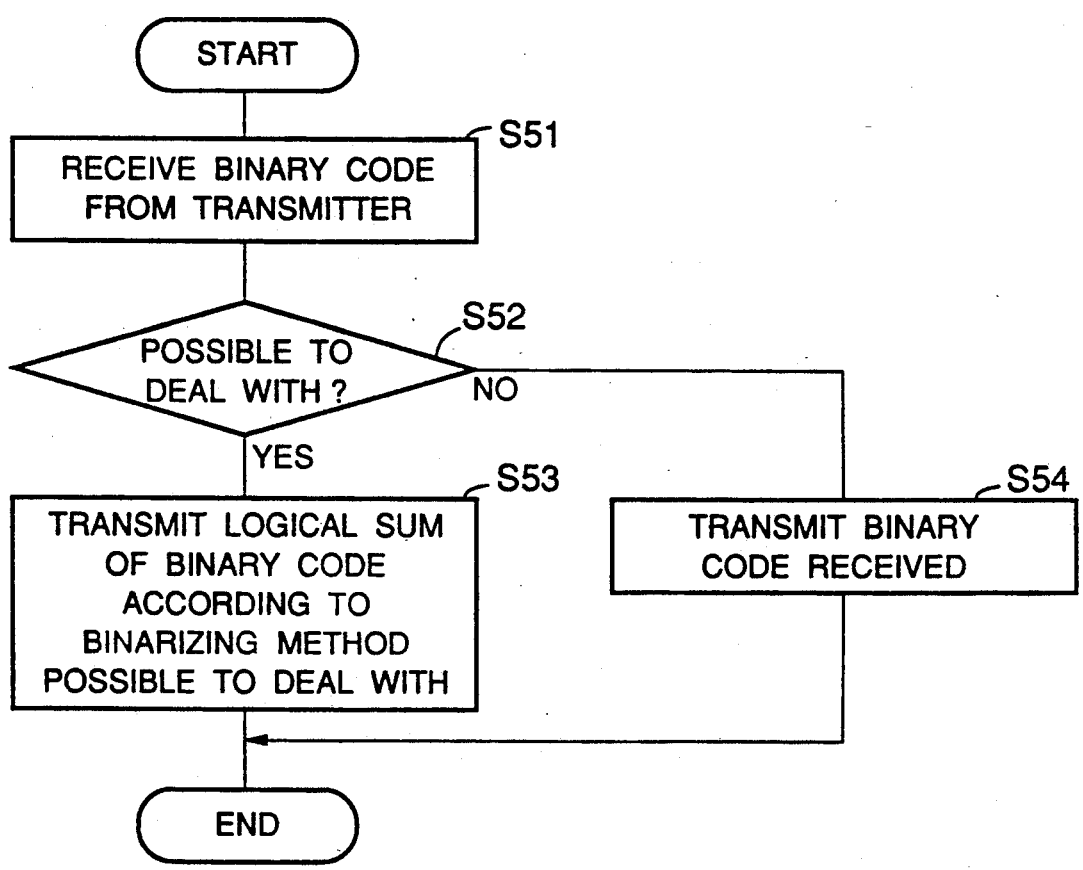
FIG. 18 is a flow chart showing an operation of a receiver of the embodiment shown in FIG. 17.

FIGS. 17 and 18 are flow charts showing other transmission/reception operations. FIG. 17 shows an operation of a transmitter, and FIG. 18 shows an operation of a receiver.

In this embodiment, when the transmitter transmits a binary code (S41), and the receiver receives the binary code (S51), if the receiver can deal with the binarizing method represented by the code (S52), it sends back the received binary code (S53); otherwise, it sends back a logical sum code (FIG. 11) representing all the binarizing methods which the receiver can use (S54). When the transmitter receives the code sent back from the receiver (S42), it compares the transmitted binary code and the received binary code (S43). If a coincidence is found between the two codes, the transmitter binarizes image data by one of the binarizing methods which can be dealt with in the receiver (S46); otherwise, the transmitter checks if the received binary code includes a usable binarizing method (S44). If the binary code includes a usable binarizing method, the transmitter selects that binarizing method (S45) to binarize image data, and then transmits the binary image data (S46); otherwise, it transmits image data without binarizing it.

As still another embodiment, the image processing unit may comprise a correction unit for performing correction in correspondence with binarizing methods, and an image processing means common to the binarizing methods. For example, correction corresponding to the binarizing methods may be performed as follows. That is, a look-up table according to a 3×3 dot pattern having a pixel of interest as the central pixel is prepared, and a value is assigned to the pixel of interest.

Furthermore, the Bayer type dithering method may be further classified into various compression methods, such as a 4×4 Bayer type dithering method, an 8×8 Bayer type dithering method, and the like.

In the above embodiment, a code representing a binarizing method is transmitted to a receiver by means of a predetermined procedure signal. However, a binary code may be transmitted as the four initial bits of image data.

In the above embodiment, when data associated with an n-value compression method is transmitted, it may be transmitted in advance or after image data is transmitted. Alternatively, the data may be transmitted during transmission of image data.

In the above embodiment, in order to discriminate whether or not a receiver can deal with an n-value compression method of image data upon transmission of n-value data, a method based on the G3 or G4 recommendation may be employed. Alternatively, a code in the above-mentioned layer of the ISDN may be used. Such a protocol may be variously changed.

In the above embodiment, a receiver communicates a usable n-value compression method to a transmitter, upon communication with the transmitter. In this information, for example, a user-to-user signal of the layer 3 specification in the TTC recommendation as described above, or other signals may be used.

As the image processing means of the above embodiment, all or some of a 2→multi-value converting method, γ correction, masking, and the like may be used.

The above-mentioned embodiment has the following effects. Since data associated with an n-value compression method is transmitted together with n-value image data, a receiver can perform proper image processing. More specifically, the receiver can select an image processing means matching with the n-value compression method of received image data. Since image data is transmitted when a receiver can deal with n-value image data to be transmitted, transmission of n-value image data which cannot be dealt with by the receiver can be prevented.

Image data can be transmitted by selecting a usable n-value compression method, and proper reproduction of an m-value image at a receiver can be guaranteed.

In this embodiment, since a receiver informs a usable n-value compression method to a transmitter, the transmitter can perform proper n-value compression.

In the above embodiment, data associated with a compression method executed by a transmitter is transmitted to a receiver. A method which does not perform such transmission will be described below.

Figure 19:
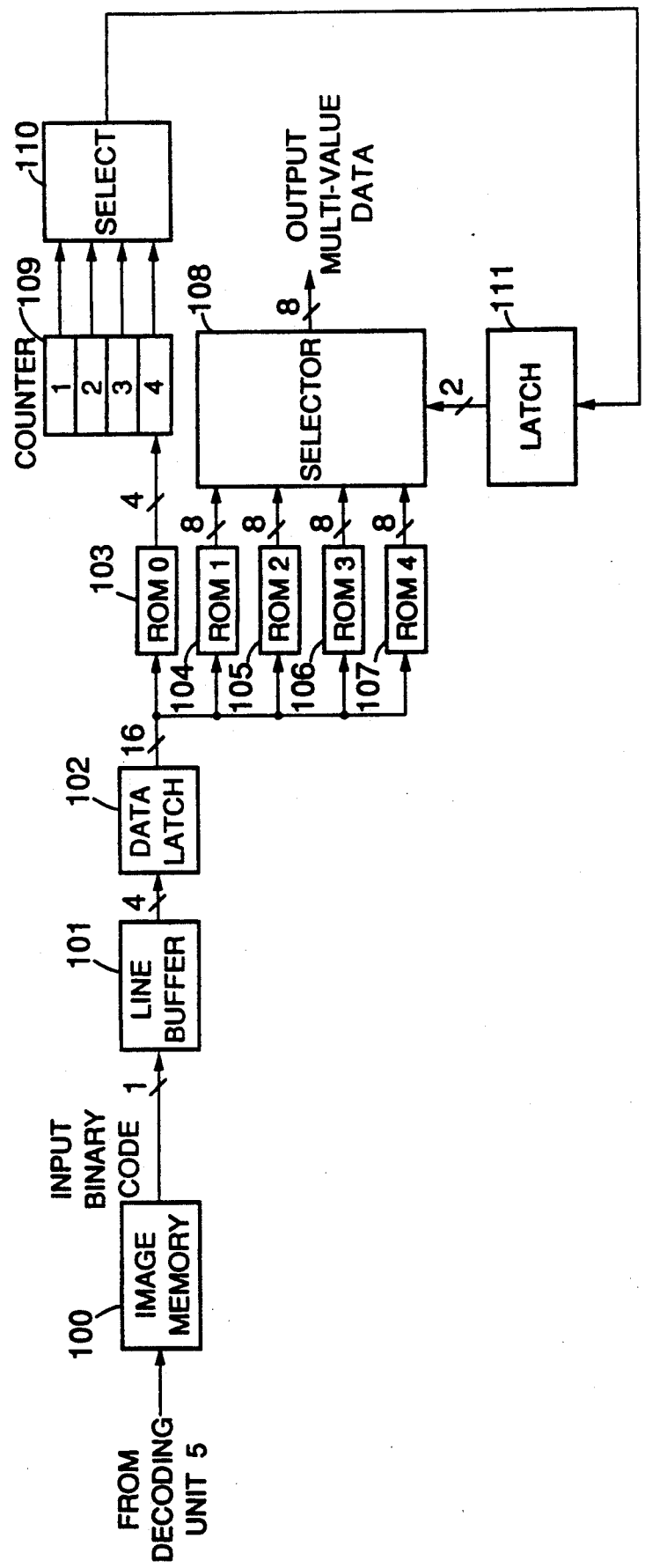
FIG. 19 is a block diagram showing an arrangement of an image processing apparatus according to still another embodiment of the present invention.
Figure 20:
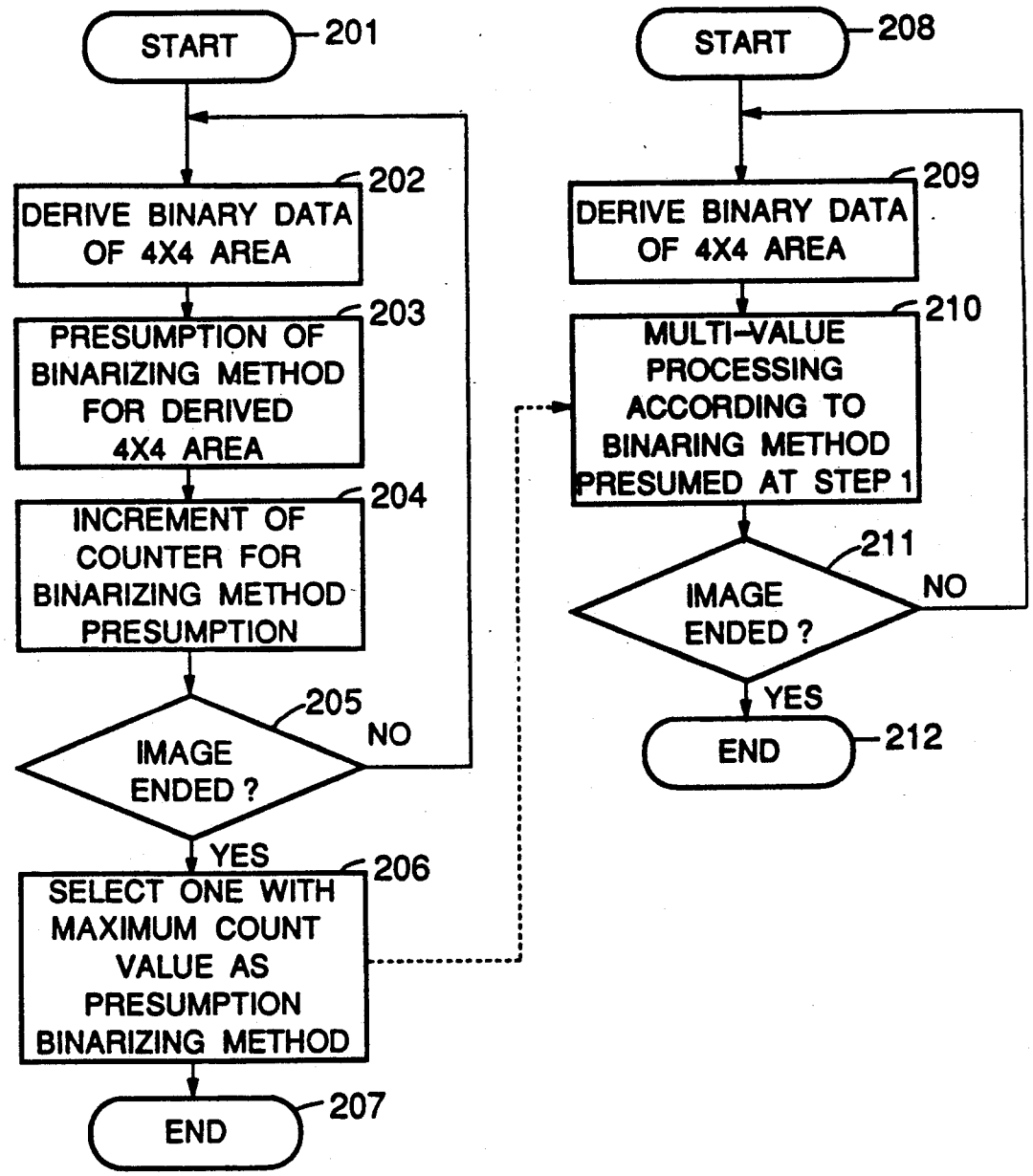
FIG. 20 is a flow chart showing the overall processing.

FIG. 19 is a block diagram showing another embodiment of the present invention, and corresponds to an arrangement to be replaced with the image processing unit 6 shown in FIG. 1. FIG. 20 is a flow chart showing a processing sequence of an image processing apparatus of this embodiment. In FIG. 20, steps 201 to 207 illustrated on the left side correspond to a sequence of processing for presuming a binarizing method of an input binary image, and steps 208 to 212 on the right side correspond to a multi-value conversion processing sequence. In this embodiment, a compression method executed by a transmitter, e.g., a binarizing method is presumed from received data, and then, multi-value conversion processing is executed.

The functions of the respective units shown in FIG. 19 will be described below while explaining the processing sequence shown in FIG. 20. In FIG. 19, a line buffer 101 comprises a FIFO, and stores data for four raster lines upon reception of input binary data. The buffer 101 is connected to a data latch 102 for latching data for four lines from the line buffer 101, i.e., data for four pixels in units of lines. Therefore, binary image data of a 4×4 window can be obtained from the data latch 102 (step 202).

4×4 pixel (16-bit) data is supplied to a ROM type conversion table 103 as an address. The conversion table 103 is determined by a neural network, as will be described later, and outputs data corresponding to one of predetermined binarizing methods on the basis of input data as a presumed binarizing method (step 203). In this embodiment, the predetermined binarizing methods correspond to an error diffusion method, a Bayer type dithering method, a Fatning type dithering method, and a simple threshold value method, as shown in FIG. 21. A counter 109 individually counts four types of data corresponding to these four binarizing methods. For example, if the table 103 determines that the input image is binarized by the error diffusion method, a counter corresponding to a portion of "1" is incremented (step 204). In step 205, it is checked if steps 202 to 204 described above are ended for the entire image. If NO in step 205, the above-mentioned steps are repeated.

When the above-mentioned processing is ended for the entire image, a select unit 110 presumes a binarizing method having a maximum count value in the counter 109 as that for the input image, and selects it. The select unit 110 then sets the selected method in a latch 111. The set data is used as a select signal for a selector 108 (to be described later) (step 206). The processing for presuming the binarizing method has been described.

Then, multi-value conversion processing as an object is executed.

In step 209, 4×4 image data is read out again from an image memory 100. This is the same processing as step 202 described above.

The read-out image data is input to multi-value conversion tables 104 to 107 each comprising a ROM. The tables 104 to 107 respectively correspond to the above-mentioned four binarizing methods, and are prepared based on multi-value processing by a neural network, as will be described later.

Outputs from the tables 104 to 107 are input to the selector 108. The selector 108 selects one of the outputs from the tables 104 to 107 in accordance with a select signal from the latch 111, and outputs the selected data as final multi-value data (step 210). The selected output is an output from the table corresponding to the presumed binarizing method selected by the select unit 110.

Steps 209 to 210 described above are repeated until it is determined in step 211 that the processing is ended for the entire image.

The above-mentioned units are controlled by a CPU (not shown).

Presumption of a binarizing method using a neural network, and multi-value processing using a neural network will be described below.

A general learning sequence in a back propagation type neural network will be described below with reference to FIG. 22A.

Figure 22A:
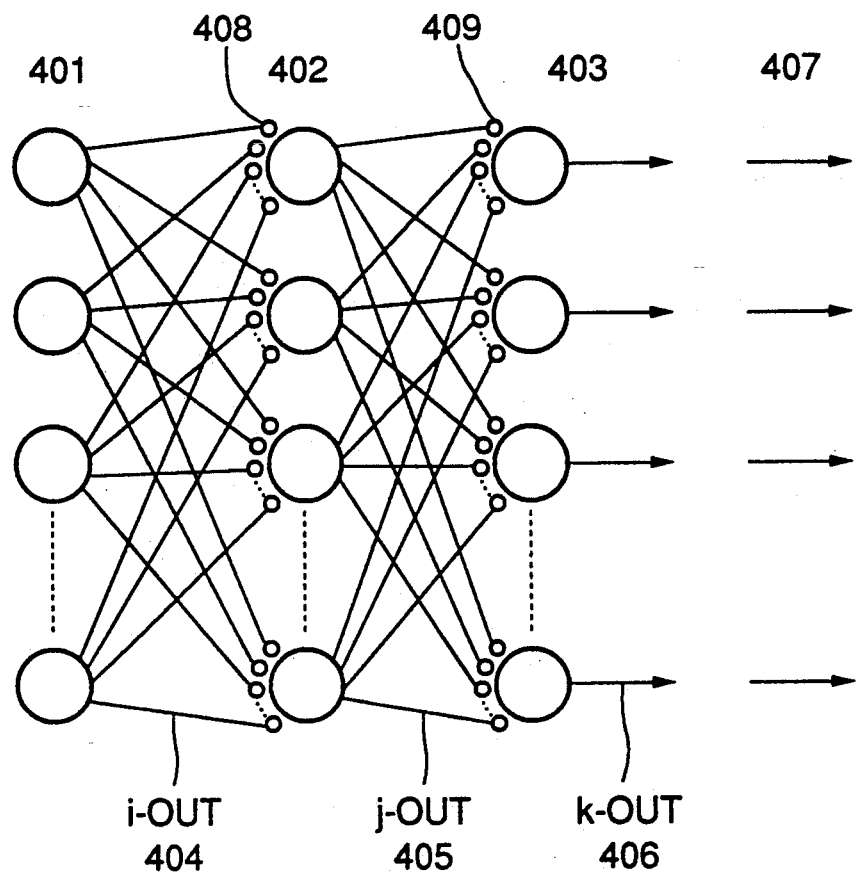
FIG. 22A is a view showing the principle of a neural network.
Figure 23:
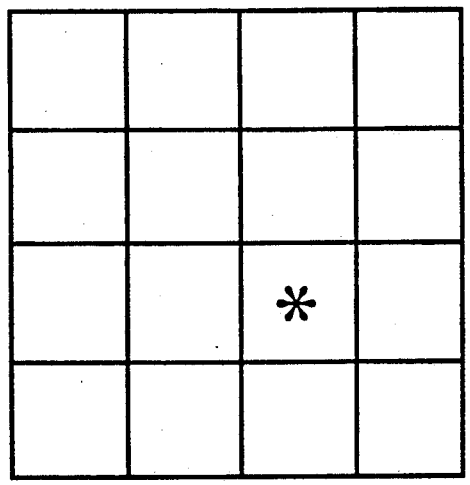
FIG. 23 shows a window.

In the neural network shown in FIG. 22A, outputs (i-out) 404 from an input layer 401 (the number of neurons ii) are input to a middle layer 402 (the number of neurons jj) comprising one layer, outputs (j-out) from the middle layer 402 are input to an output layer 403 (the number of neurons kk), and outputs (k-out) 406 are output from the output layer 403. Note that 407 designates ideal outputs (ideal-out).

In the neural network, input data, and a corresponding ideal output (ideal-out) are prepared, and are compared with an output (k-out) 406 to determine a coupling intensity $W_{ji}[jj,ii]$ in the middle layer (408 in FIG. 22A), and a coupling intensity $W_{kj}[kk,jj]$ in the output layer (409 in FIG. 22A).

The learning sequence using the above-mentioned neural network will be described in detail below with reference to the flow chart shown in FIG. 22B.

In step S401, initial values of weightinig factors (coupling intensities) $W_{kj}[jj,ii]$ and $W_{kj}[kk,jj]$ are provided. In this case, values within a range of $-0.5$ to $+0.5$ are selected in consideration of convergence in a learning process.

In step S402, learning input data i-out(i) is selected, and in step S403, this data i-out(i) is set in the input layer. In step S404, an ideal output (ideal-out) corresponding to the input data i-out(i) is prepared.

In step S405, outputs j-out(j) of the middle layer are calculated.

The weightinig factor $W_{kj}$ of the middle layer is multiplied with the data i-out(i) from the input layer, and a total sum $Sum_{Fj}$ of the products is calculated as follows:

$$Sum_{Fj} = \sum_i W_{ji}[jj,ii] * i\text{-}out(i)$$

A sigmoid function is used to calculate an output j-out(j) of a j-th middle layer from $Sum_{Fj}$ as follows:

$$j\text{-}out(j) = \frac{1.0}{1.0 + \exp(-Sum_{Fj})}$$

In step S406, outputs k-out(k) of the output layer are calculated. This procedure is the same as that in step S406.

More specifically, the weightinig factor $W_{kj}$ of the output layer is multiplied with the outputs j-out(j) from the middle layer, and a total sum $Sum_{Fk}$ of the products is calculated as follows:

$$Sum_{Fj} = \sum_j W_{kj}[kk,jj]*\text{j-out}(j)$$

The sigmoid function is used to calculate an output k-out(k) of a k-th output layer from $Sum_{Fk}$ as follows:

$$\text{k-out}(k) = \frac{1.0}{1.0 + \exp(-Sum_{Fk})}$$

Note that this output value is normalized.

In step S407, the output k-out(k) obtained in this manner is compared with the ideal output ideal-out(k) prepared in step S404, and a teaching signal teach-k(k) of the output layer is calculated as follows:

$$\text{teach-}k(k) = \{\text{ideal-out}(k) - \text{k-out}(k)\}*\text{k-out}(k)*\{1 - \text{k-out}(k)\}$$

where k-out(k)*{1−k-out(k)} has a significance of differentiation of the sigmoid function k-out(k).

In step S408, a changing width $\Delta W_{kj}[kk,jj]$ of the weightinig factor of the output layer is calculated as follows:

$$\Delta W_{kj}[kk,jj] = \beta *\text{j-out}(j)*\text{teach-}k(k) + \alpha *\Delta W_{kj}[kk,jj]$$

where $\alpha$ is the stabilization constant, and $\beta$ is a constant called a learning constant, which serves to suppress any abrupt change.

In step S409, the weightinig factor $W_{kj}[kk,jj]$ is renewed based on the changing width as follows:

$$W_{kj}[kk,jj] = W_{kj}[kk,jj] + \Delta W_{kj}[kk,jj]$$

That is, learning is performed.

In step S410, a teaching signal teach-j(j) of the middle layer is calculated. For this purpose, contribution from the output layer to the respective elements of the middle layer in the reverse direction is calculated based on the following equation:

$$Sum_{Bj} = \sum_k \text{teach-}k(k)*W_{kj}[jj,ii]$$

The teaching signal teach-j(j) of the middle layer is calculated based on $Sum_{Bj}$ as follows:

$$\text{teach-}j(j) = \text{j-out}(j)*\{1 - \text{j-out}(j)\}*Sum_{Bj}$$

In step S411, a changing width $\Delta W_{ji}[jj,ii]$ of the weightinig factor of the middle layer is calculated as follows:

$$\Delta W_{ji}[jj,ii] = \beta *\text{i-out}()*\text{teach-}j(j) + \alpha *\Delta W_{ji}[jj,ii]$$

In step S412, the weightinig factor $W_{ji}[jj,ii]$ is renewed based on the changing width as follows:

$$W_{ji}[jj,ii] = W_{ji}[jj,ii] + \Delta W_{ji}[jj,ii]$$

That is, learning is performed.

In this manner, in steps S401 to S412, the weightinig factors $W_{ji}$ and $W_{kj}$ are learned once on the basis of a set of input data and a corresponding ideal output.

It is checked in step S413 if the weightinig coefficients are sufficiently converged by the above-mentioned learning. If NO in step S413, steps S401 to S412 are repeated.

The learning procedure of the neural network based on the back propagation method has been described.

The above-mentioned learning is a preparation stage for processing, and in actual processing, only the obtained weighting coefficients, that is, only a table of processing results for all the possible inputs using these weighting coefficients is used.

A case will be exemplified below wherein the above-mentioned "learning" is performed for a neural network for presuming a multi-value image from a binary image.

Input data are values (0 or 1) of pixels in a 4×4 window of image data binarized by a binarizing method as an object to be learned.

Therefore, the number of neurons of the input layer is 16, the number of neurons of the output layer is one since a multi-value output is for one pixel, and the number of neurons of the middle layer is arbitrary but is 12 in this embodiment.

On the other hand, an ideal output is assumed to be multi-value image data as an original image of input binary data.

As a method of selecting input data, a learning pixel is randomly selected, and a 4×4 window including the selected pixel is arranged.

The weightinig factors are determined by the above-mentioned learning sequence using the above-mentioned parameters (therefore, coupling of the neural network is determined).

In this embodiment, the processing of the neural network is prepared as a table. For this purpose, outputs corresponding to all the 4×4 input patterns ($2^{16}$ patterns) based on the determined neural network are obtained, and are stored in a ROM.

In this embodiment, the above-mentioned processing operations (learning and preparation of ROMs) are independently performed for the respective methods in correspondence with the four binarizing methods, thereby preparing for the four conversion tables 104 to 107.

On the other hand, learning for presuming a binarizing method is almost similarly performed.

First, input data are values (0 or 1) of pixels in a 4×4 window of image data binarized by four binarizing methods as objects to be learned.

Therefore, the number of neurons of the input layer is 16, the number of neurons of the output layer is four since one of the four binarizing methods is to be presumed, and the number of neurons of the middle layer is arbitrary but is 12 in this embodiment as in the above case.

On the other hand, an ideal output is assumed to be a logical value representing one of the four binarizing methods as that for input data.

As a method of selecting input data, a learning pixel is randomly selected, and a 4×4 window including the selected pixel is arranged in the same manner as in the above-mentioned case. Furthermore, data binarized by one of the four binarizing methods is randomly selected to cause one neural network to learn.

In the above embodiment, the processing of the neural network is performed using the conversion tables. Alternatively, a neuro chip having the obtained weighting factors may be used.

The window size is not limited to 4×4 but may be 5×5, 3×4, and the like.

Different window sizes may be adopted in presumption of a binarizing method, and in presumption of a multi-value image, and may be adopted depending on binarizing methods in presumption of a multi-value image.

As described above, according to this embodiment, a binarizing method of an input binary image is presumed, and multi-value conversion is performed in accordance with the presumed binarizing method. Therefore, a high-quality multi-value image can be obtained.

In the above embodiment, binarization is performed as n-value compression. However, the present invention is not limited to binarization, but may be three-value conversion, four-value conversion, and the like.

In the above embodiment, image data is input from the scanner unit 1. However, the present invention is not limited to the scanner. For example, image data may be input from a video camera, a still video camera, or an image database.

In the above embodiment, an image is output to the printer unit 7, but may be output to a CRT, an image database, or the like.

In the above embodiment, R, G, and B data are processed as image data. Similarly, X, Y, and Z data or L*, a*, b* data representing color data, or Y, I, Q data used in a television signal may be used.

What is claimed is:

1. An image communication method of converting m-value image data into n-value image data, and transmitting the n-value image data, comprising the step of:
    transmitting data associated with a compression method upon transmission of said n-value image data,
    wherein, when the data associated with the compression method is transmitted, data associated with a plurality of compression methods which can be processed at a transmission side is transmitted.

2. A method according to claim 1, wherein said n-value image data is n-value data for one pixel.

3. A method according to claim 1, wherein said n-value image data is binary data.

4. A method according to claim 1, wherein said m-value image data is color image data.

5. A method according to claim 1, wherein said compression method includes a binarizing method based on a dithering method.

6. A method according to claim 5, wherein said compression method includes a density preservation type binarizing method.

7. A method according to claim 1, wherein said compression method is a simple binarizing method.

8. A method according to claim 1, wherein said data associated with said compression method is a user-to-user signal provided in an ISDN network.

9. An image reception method of receiving n-value image data converted from m-value image data by a predetermined compression method, comprising the step of:
    informing data associated with usable n-value conversion methods of a reception side to a transmission side.

10. A method according to claim 9, wherein said n-value image data is n-value data for one pixel.

11. A method according to claim 9, wherein said n-value image data is binary data.

12. A method according to claim 9, wherein said m-value image data is color image data.

13. A method according to claim 9, wherein said compression method includes a binarizing method based on a dithering method.

14. A method according to claim 13, wherein said compression method includes a density preservation type binarizing method.

15. A method according to claim 9, wherein said compression method is a simple binarizing method.

16. A method according to claim 9, wherein the data associated with said compression method is a user-to-user signal provided in an ISDN network.

17. An image communication method of converting m-value image data to n-value image data, and transmitting the n-value image data, comprising the steps of:
    discriminating whether or not a reception side can deal with a compression method of said image data when said n-value image data is transmitted; and
    selecting a usable compression method in accordance with said discrimination result.

18. A method according to claim 17, further comprising the steps of:
    transmitting data associated with the compression method of said image data prior to transmission of said n-value image data;
    receiving data indicating whether or not the reception side can deal with said compression method; and
    selecting the compression method on the basis of the selected data.

19. A method according to claim 18, wherein said n-value image data is n-value data for one pixel.

20. A method according to claim 18, wherein said n-value image data is binary data.

21. A method according to claim 18, wherein said m-value image data is color image data.

22. A method according to claim 18, wherein said compression method includes a binarizing method based on a dithering method.

23. A method according to claim 22, wherein said compression method includes a density preservation type binarizing method.

24. A method according to claim 18, wherein said compression method is a simple binarizing method.

25. A method according to claim 18, wherein the data associated with said compression method is a user-to-user signal provided in an ISDN network.

26. An image reception method of receiving n-value image data converted from m-value image data by a predetermined compression method together with data associated with said compression method, comprising the step of:
    discriminating whether or not a reception side can deal with said compression method.

27. A method according to claim 26, further comprising the step of:
    transmitting data according to said discrimination result to a transmission side.

28. A method according to claim 27, wherein said n-value image data is n-value data for one pixel.

29. A method according to claim 27, wherein said n-value image data is binary data.

30. A method according to claim 27, wherein said m-value image data is color image data.

31. A method according to claim 27, wherein said compression method includes a binarizing method based on a dithering method.

32. A method according to claim 31, wherein said compression method includes a density preservation type binarizing method.

33. A method according to claim 27, wherein said compression method is a simple binarizing method.

34. A method according to claim 27, wherein the data associated with said compression method is a user-to-user signal provided in an ISDN network.

35. An image processing method comprising the steps of:
    presuming a compression method of received n-value image data using a neural network; and
    controlling a processing method of said n-value image data on the basis of the presumed compression method.

36. A method according to claim 35, wherein said n-value image data is n-value data for one pixel.

37. A method according to claim 35, wherein said n-value image data is binary data.

38. A method according to claim 55, wherein said m-value image data is color image data.

39. A method according to claim 35, wherein said processing method controls a method of multi-value converting said n-value image data.

40. A method according to claim 35, wherein said processing method includes a method of switching multi-value conversion tables.

41. An image processing method comprising the steps of:
    presuming a compression method of received n-value image data; and
    processing said n-value image data on the basis of the presumed compression method.

42. A method according to claim 41, wherein said n-value image data is n-value data for one pixel.

43. A method according to claim 41, wherein said n-value image data is binary data.

44. A method according to claim 41, wherein said m-value image data is color image data.

* * * * *

UNITED STATES PATENT AND TRADEMARK OFFICE
CERTIFICATE OF CORRECTION

PATENT NO. : 5,187,592
DATED : February 16, 1993
INVENTOR(S) : Mitsumasa Sugiyama, et al It is certified that error appears in the above-indentified patent and that said Letters Patent is hereby corrected as shown below:

COLUMN 1

Line 30, "type used" should read --type of binarizing method used-- and "method of binarizing" should be deleted.

COLUMN 16

Line 16, "method." should read --method using a neural network--.

Signed and Sealed this

Twenty-eighth Day of December, 1993

Attest:

BRUCE LEHMAN

Attesting Officer          Commissioner of Patents and Trademarks